United States Patent [19]

Barclay et al.

[11] Patent Number: 4,459,811
[45] Date of Patent: Jul. 17, 1984

[54] MAGNETIC REFRIGERATION APPARATUS AND METHOD

[75] Inventors: John A. Barclay; William C. Overton, Jr.; Walter F. Stewart, all of Los Alamos, N. Mex.

[73] Assignee: The United States of America as represented by the United States Department of Energy, Washington, D.C.

[21] Appl. No.: 479,596

[22] Filed: Mar. 28, 1983

[51] Int. Cl.³ .............................................. F25B 21/02
[52] U.S. Cl. ................................................ 62/3; 62/6; 62/467
[58] Field of Search ............................ 62/3, 6, 467 R

[56] References Cited

U.S. PATENT DOCUMENTS

| | | | |
|---|---|---|---|
| 3,875,435 | 4/1975 | Wang et al. | 62/3 |
| 4,033,734 | 7/1977 | Steyert, Jr. et al. | 62/3 |
| 4,107,935 | 8/1978 | Steyert, Jr. | 62/467 R |
| 4,118,943 | 10/1978 | Chellis | 62/6 |
| 4,332,135 | 6/1982 | Barclay et al. | 62/3 |
| 4,408,463 | 10/1983 | Barclay | 62/3 |

OTHER PUBLICATIONS

J. A. Barclay, "A 4K to 20K Rotational–Cooling Magnetic Refrigerator Capable of 1 mW to 7 W Operation," Cryogenics, 267–472 (Aug. 1980).
T. Hashimoto et al., "A New Usage of Anisotropic Magnetic Compound for the Magnetic Refrigerant," Proc. Int. Cryogenic Engr. Conf., Kobe, Japan, 5, 1982, Paper CF1-3, pp. 1-4.

Primary Examiner—Ronald C. Capossela
Attorney, Agent, or Firm—Leonard C. Brenner; Paul D. Gaetjens; Michael F. Esposito

[57] ABSTRACT

The disclosure relates to refrigeration through magnetizing and demagnetizing a body by rotating it within a magnetic field. Internal and external heat exchange fluids and in one embodiment, a regenerator, are used.

20 Claims, 10 Drawing Figures

MAGNETIC REFRIGERATION APPARATUS AND METHOD

BACKGROUND OF THE INVENTION

The invention relates to magnetic refrigeration and more particularly to magnetic refrigeration utilizing a demagnetizing effect. This invention is the result of a contract with the Department of Energy (Contract No. W-7405-ENG-36).

A flat sheet of ferromagnetic material when disposed in a magnetic field exhibits a demagnetizing factor which approaches unity when the surface of the flat material is perpendicular to the direction of the applied magnetic field and which is near zero when the plane of the sheet is parallel to the direction of the applied magnetic field. The demagnetizing factor effect is a result of boundary conditions and holds at any temperature where the magnetization exists. However, the effect that the demagnetizing factor has on the entropy of the material is only large near the Curie temperature of the material. The demagnetizing factor is a function of the boundary conditions on manetic induction B and magnetic field H between a body of ferromagnetic material and a second medium. The second medium can be vacuum, air, or any relatively nonmagnetic material. The demagnetizing factor is indicative of the penetration of the magnetic field into the magnetic body and is dependent on the shape of the magnetic body.

The demagnetizing effect may be expressed as a reverse field dependent on the shape and magnetization of a body as exemplified by the following equation:

$$H_{in} = H_{out} - NM$$

where N is the demagnetizing factor, $H_{in}$ is the magnetic field strength inside the body, $H_{out}$ is the magnetic field strength outside the body, and M is the magnetization of the sample. For example, in an infinite sheet, N = unity when the applied field is perpendicular to the sheet and equals zero when the applied field is parallel to the sheet. In a sphere N = ⅓ for any orientation.

Magnetic refrigeration depends upon magnetizing and demagnetizing a body such as a sheet of material. In practicing the instant invention, refrigeration is achieved by changing the orientation of the body so that magnetization and demagnetization occur due to the demagnetizing effect. Important in changing the effects of applied magnetic induction is the reluctance of the magnetic circuit. If the body is oriented such that the path length of weakly magnetic material in the magnetic circuit is small when the demagnetizing factor approaches zero, and oriented such that the path length of weakly magnetic material in the magnetic circuit is large when the demagnetizing factor approaches unity, the net change in the internal magnetization is enhanced over that due to the demagnetizing effect alone. More quantitatively, when the external magnetic induction is parallel to the sheet, the internal magnetization becomes very large because of two factors, as shown by the formula, $$M_{\parallel} = (\mu_{in}/\mu_o - 1)(B_{out}/\mu_o)/(1-f)$$

where $\mu_o$ is the permeability of free space, $B_{out}$ is the external magnetic induction and f is a geometric factor expressing the increase of $B_{out}$ due to the decrease in the reluctance of the magnetic circuit. Here $\mu_{in}/\mu_o$ is the relative magnetic permeability of the material. The relative magnetic permeability may be a number as large as several thousand but generally is a function of $H_{in}$.

Rotation of the sheet to be perpendicular position results in a significant demagnetizaiton in accordance with the formula, $$M_{\perp} = (1 - \mu_o/\mu_{in})(b_{out}/\mu_o).$$

Thus, the ratio $M_{\parallel}/M_{\perp} = (\mu_{in}/\mu_o)/(1-f)$ illustrates the very large change in magnetization possible simply by rotating a sheet or stack of parallel sheets within a magnetic field. When many sheets of high magnetic permeability are stacked. The factor f may be as large as 0.5 to 0.9, significantly increasing the magnetization $M_{\parallel}$.

The degree of refreigeration achievable by magnetizing and demagnetizing a body in practicing the invention relates to the saturation magnetization of the actual body used. When the external field is approximately equal to $\mu_o M_{sat}$ where $M_{sat}$ is fully magnetized, there is no further magnetization effect possible from the demagnetizing factor. Therefore, the maximum field change in practicing the invention is approximately 2 Telsa (T). This is because $M_{sat} = Ng\beta J$; where N is atoms per mole, an approximately fixed number; g and $\beta$ are constants and J represents electronic spin, having a maximum value of eight for all known materials. For example, for Fe, J=5/2, for Gd, J=7/2 and for Ho, J=8. When the value of $M_{sat}$ is calculated, a value of $\mu_o M_{sat}$ of about 2T is the maximum value.

Permanent magnets can be used as a field source to practice the invention, and it is known that they are limited to about this field magnitude. Thus, the invention can be implemented in low field, portable refrigerators where reliability and simplicity are more important than other features. The efficiency of magnetic refrigerators in accordance with the invention is equal to or better than existing gas cycle refrigerators of the same cooling power. Those skilled in the art will appreciate that because the invention may be practiced with any ferromagnet operated near its Curie temperature, applications are not limited to room temperature but can be practiced down to pumped liquid helium temperature (2 K).

One object of the present invention is to reliably refrigerate over a wide temperature range.

One advantage of the instant invention is that embodiments thereof are more efficient than comparable gas cycle refrigerators.

Another advantage of the instant invention is that refrigeration therewith can be accomplished over a very wide range of temperatures by using a wide selection of ferromagnetic materials.

Still another advantage of the invention is that an apparatus in accordance with the invention is service free for extended periods of time beeausee it is mechanically simple.

Another advantage of the instant invention is that refrigerators in accordance therewith are relatively small in size, low in operational speed, and high in reliability.

SUMMARY OF THE INVENTION

In accordance with the present invention there is provided an apparatus and method of refrigeration, the apparatus comprising a magnetic field producing deivce and a ferromagnetic body disposed within the magnetic field. During operation of the refrigeration apparatus the ferromagnetic body remains near its Curie temperature. The body is geometrically structured or configured to undergo magnetization and demagnetization in accordance with its orientation within the magnetic field. Structure is provided for rotating the body about an axis essentially perpendicular to the field between a substantially magnetized orientation and a substantially demagnetized orientation. Heat exchange between the body and a fluid occurs at selected times to accomplish refrigeration. In the preferred embodiment internal heat exchange fluid as well as external heat transfer fluids and large thermal masses may be utilized. An internal heat exchange fluid containing regenerator can be slidably positioned about the body. The body may comprise a plurality of flat masses having large spaced adjacent surface areas, porous magnetic material, parallel plates and the like.

In practicing the invention, Brayton, Carnot, Ericsson, and Stirling cycles can be aproximated.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

A magnetic refrigerator must execute a thermodynamic cycle to pump heat from a source to a sink. For example, a magnetic Brayton cycle comprises four steps: first, an adiabatic magnetization from temperature $T_H$ to $T_H + \Delta T_H$; second, an isofield temperature decrease to temperature $T_C$; third, an adiabatic demagnetization to $T_C - \Delta T_C$; and fourth, an isofield temperature increase to temperature $T_H$. In previous magnetic refrigerator designs such as disclosed in U.S. Pat. No. 4,332,135 to Barclay et al. issued June 1, 1982, adiabatic steps were achieved by moving a magnetic material in or out of a magnetic field and by turning the field on and off. In practicing the present invention, a body of a selected geometric configuration and comprising ferromatnetic material is magnetized and demagnetized by rotating it within a constant magnetic field, such as one which may be produced by permanent magnets. Since it rotates within a fixed magnetic field, the body of ferromagnetic material never leaves or returns to the magnetic field. Too, the field need not be turned on and off. Simplicity is therefore possible in structures and operation of apparatus in accordance with the present invention.

Figures 1, 3, 4:
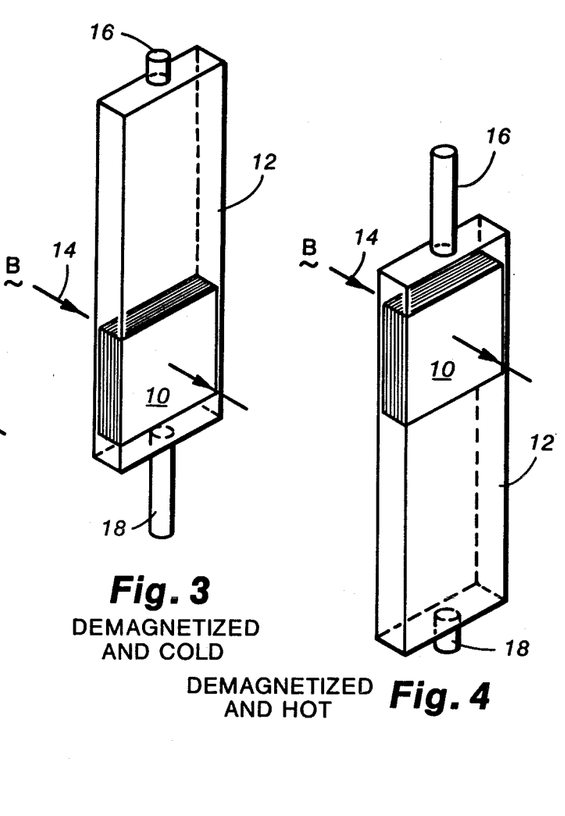
FIGS 1-4 show a ferromagnetic body enclosed within a regenerator disposed in magnetized and demagnetized positions within a magnetic field.

Reference is now made to FIG. 1 which shows a body 10 within a regenerator 12. The regenerator housed body is disposed within a magnetic field 14 indicated by the flux line 14 designated B. An internal fluid or heat exhange fluid can pass through regenerator 12, entering it through conduits 16 and 18 which communicate with the interior of the regenerator.

As seen in FIGS. 1-4, body 10 in the preferred embodiment may comprises a plurality of sheets of ferromagnetic material which are essentially parallel and spaced a little apart so that the body provides very large surface areas for heat exchange with the heat exchange fluid that passes through the regenerator. The ferromagnetic body may comprise a plurality of plates which are ribbed, corrugated and the like. It may also comprise a porous block of ferromagnetic material or a plurality of porous blocks of such material. Too, it may comprise one or more blocks of ferromagnetic materials having apertures such as drilled holes passing therethrough. It will be appreciated by those skilled in the art that the body is not limited to a plurality of flat plates or a block or blocks of material. The body may be of any configuration which will substantially demagnetize and magnetize when rotated about an axis perpendicular to the direction of the magnetic field in which it is rotated. Such a body will preferably be geometrically structured to provide large surface area for heat transfer to a passing fluid and may comprise, for example, a plurality of cylinders, solid or hollow, stacked together, a honey combed structure, and the like. Those skilled in the art will appreciate that in order to have efficient heat transfer, the body should present large amounts of surface area to passing fluids. Thus, a single solid body would be far less efficient than, for example, one comprising the parallel spaced plates of the preferred embodiment.

Figures 1, 2:
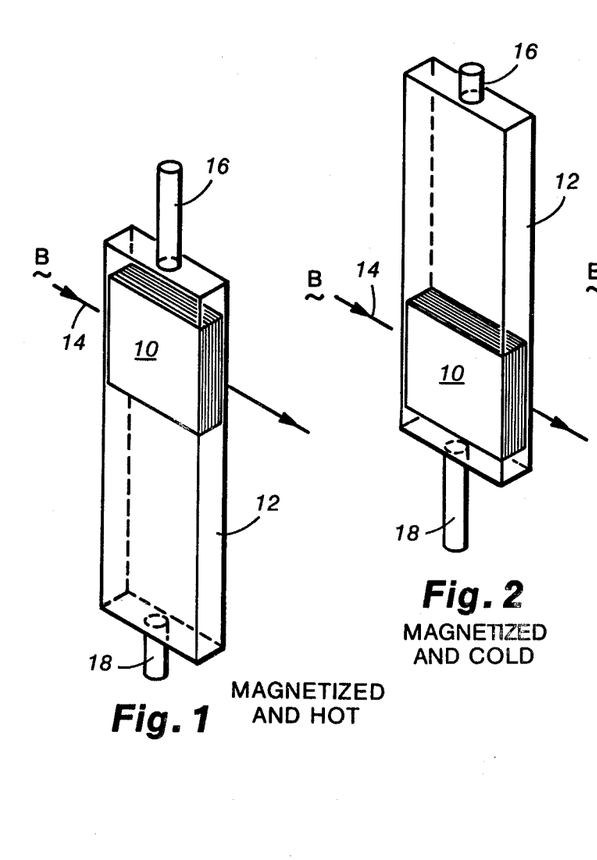

FIGS. 1 and 4 show the regenerator 12 in its "bottom" position whereas FIGS. 2 and 3 show the regenerator 12 in its "top" position. In operating the preferred embodiment of the invention, body 10 need not move laterally relative to the magnetic field. It need only rotate at least 90° about an axis perpendicular to the field. Of course, the regenerator could be fixed but rotatable and the body could move up and down relative thereto. The field could also be rotated about a fixed body. Too, a combination of body and field rotations could be used. In FIGS. 1 and 2 where the body 10 is parallel to the magnetic field, it is in a substantially magnetized position whereas in FIGS. 3 and 4 where the body is essentially perpendicular to the magnetic field, it is in a substantially demagnetized position.

In operating the preferred embodiment over certain cycles a regenerator is not required. In using such cycles the element 12 comprises a simple housing through which fluid may be flowed. It need not be movable or slideable relative to the body 10.

Figure 5:
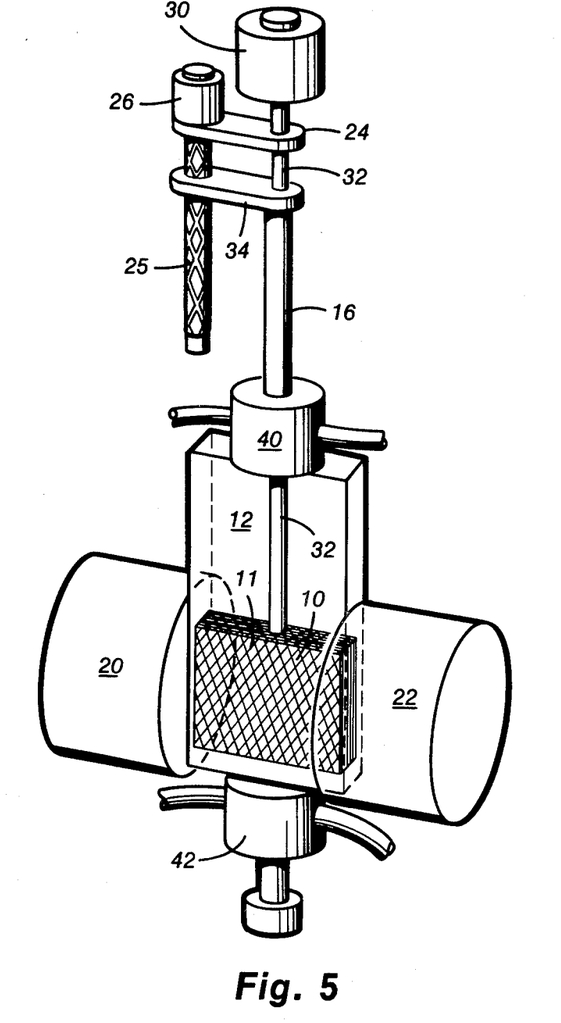
FIG. 5 illustrates the regenerator and ferromagnetic body of FIGS. 1-4 utilized in a preferred embodiment of the invention.
Figure 6:
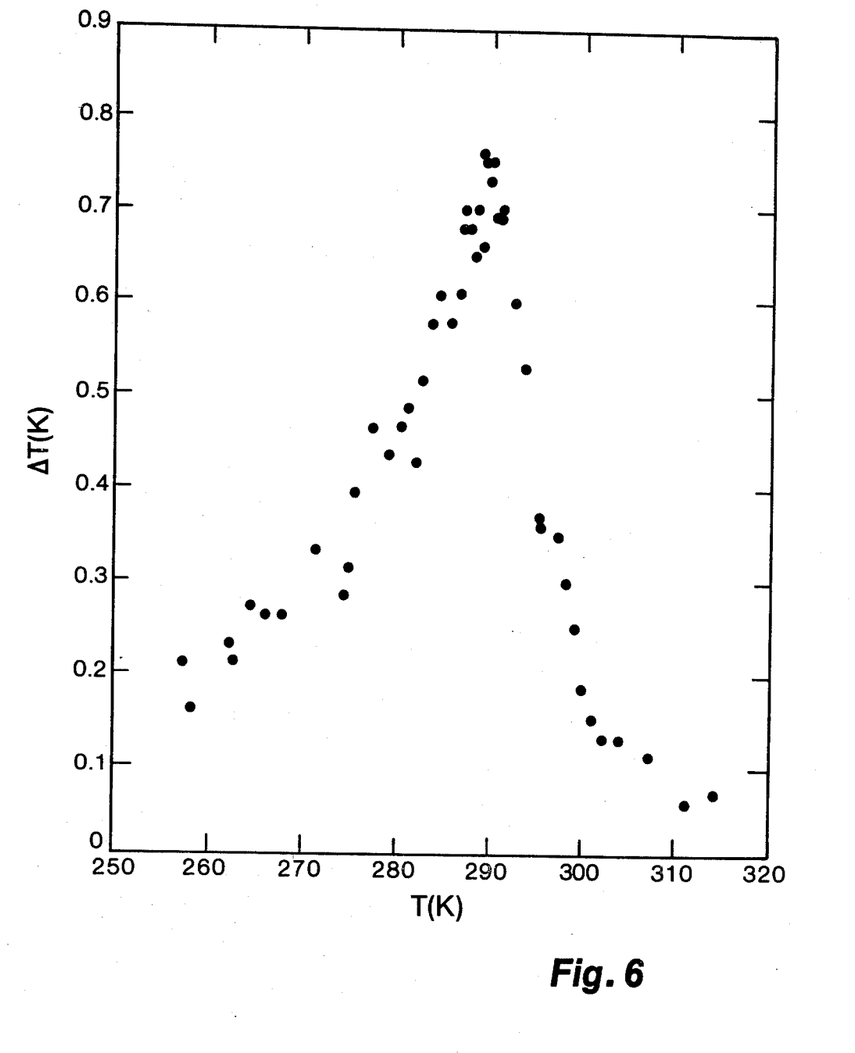
FIG. 6 shows adiabatic temperature change as a function of temperature for a sheet of gadolinium metal rotated in a 0.3 T magnet.

Reference is now made to FIG. 5 which shows the regenerator 12 containing body 10 within screen 11 which supports the plates of the body 10 spaced parallel to one another and grouped together. As shown therein, body 10 is disposed within a magnetic field produces between two magnets 20 and 22 which may be either permanent magnets or electromagnetic poles. Regenerator 12 is movable between its top position as seen in FIGS. 2, 3 and 5 to its bottom position as seen in FIGS. 1 and 4 by means of a linear actuator 25 driven by a linear actuator motor 26. Actuator 25 rotates in a bearing containing orifice in a support element 24 and engages a pawl (not shown) in a second support element 34 fastened to a regenerator drivetube 16. Thus, when motor 26 rotates actuator 25, it moves regenerator 12 up and down over body 10. Regenerator 12 and body 10 are rotated by a second motor 30 through a driveshaft 32 which extends through hollow cylindrical regenerator drive tube 16 and fastens to screen 11 containing body 10. Element 24 is secured to driveshaft 32 and turns therewith. Element 34 is secured to drive tube 16 and turns therewith. Driveshaft 32 extends completely through drive tube 16 which slides thereover. Heat exchangers 40 and 42 are provided at the ends of the regenerator 12 and operatively coupled thereto. External heat exchange fluid is passed through heat exchangers 40 and 42 through other conduits.

The apparatus of FIG. 5 can be utilized to practice the Brayton cycle, Carnot cycle, Ericsson cycle, and the Stirling cycle to accomplish refrigeration in accordance with the invention. The ferromagnetic materials used in body 10 may be, for example, any of those disclosed in the Table in U.S. Pat. No. 4,332,135 as well as other ferromagnetic materials. It will be appreciated by those skilled in the art that in practicing the invention the body 10 is operated over a small temperature range near the Curie temperature of its ferromagnetic material.

Figure 7:
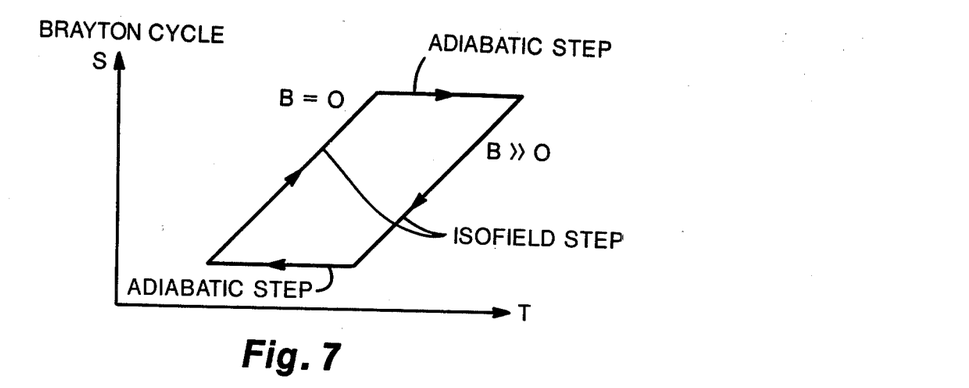
FIGS. 7-10 show how the preferred embodiment utilizes Brayotn, Carnot, Ericsson, and Stirling cycles to accomplish refrigeration.
Figure 8:
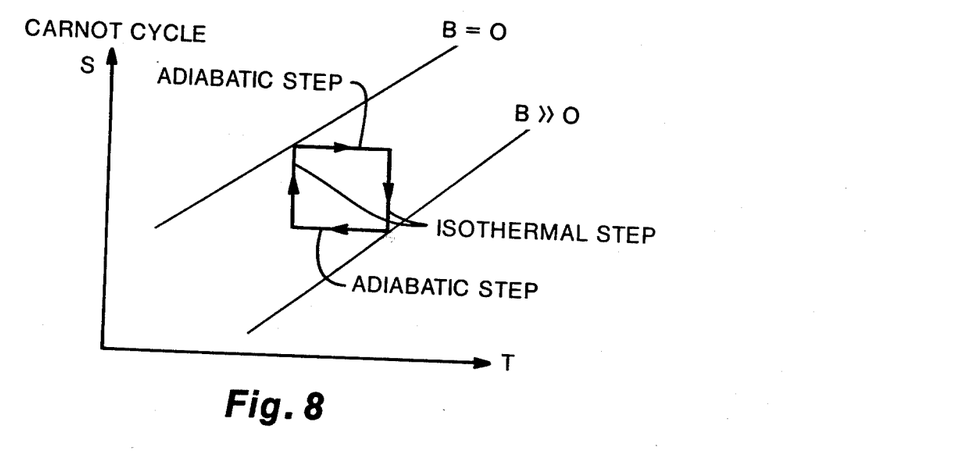
Figure 9:
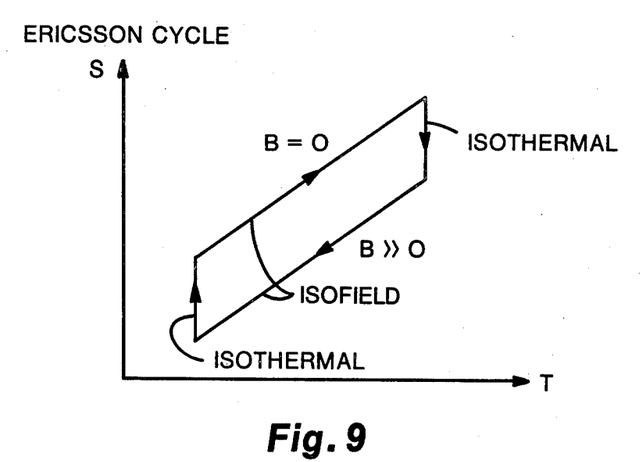
Figure 10:
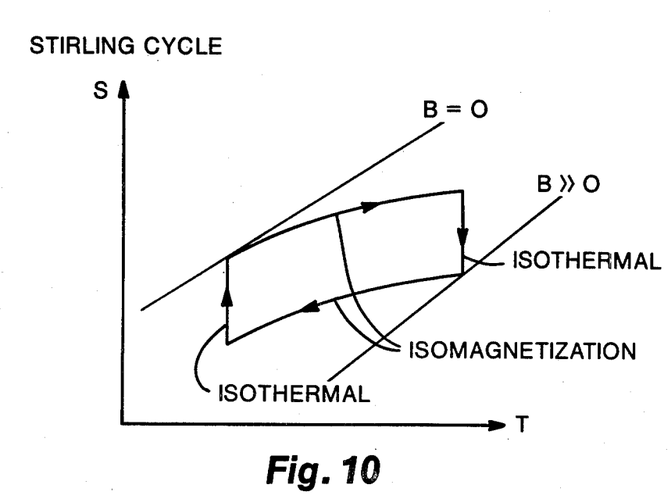

In order to operate the preferred embodiment of the invention in a mode approximating a Brayton cycle as shown in FIG. 7, the ferromagnetic material body is placed near its Curie temperature within the magnetic field at a temperature essentially $T_H$, the body being oriented so that its demagnetizing factor is near unity. The described position is shown in FIG. 4 and the regenerator is in its bottom position. The body and the regenerator are rotated to the substantially magnetized position shown in FIG. 1. This magnetizes the body and increases its temperature from essentially $T_H$ to essentially $T_H + \Delta T_H$. The regenerator is then moved from its bottom position to its top position as seen in FIG. 2. This warms the internal heat exchange fluid within the regenerator and cools the still magnetized body to a temperature of essentially $T_C$. The body and regenerator are again rotated to a substantially demagnetized position as seen in FIG. 3 to adiabatically demagnetized the body from its temperature of essentially $T_C$ to a temperature of essentially $T_C - \Delta T_C$. The regenerator is then moved from the top position of FIG. 3 to the bottom position of FIG. 4 to cool the internal heat exchange fluid and warm the body to essentially $T_H$. During these movements heat from the internal heat exchange fluid is transferred to two external heat exchange transfer fluids through heat exchangers 40 and 42. Heat transfer can be caused to occur during or immediately after the magnetization or demagnetization.

In practicing the invention over the Carnot cycle, the body is disposed near its Curie temperature within the magnetic field. No regenerator is required and the body is disposed within a housing. Two two-phase fluids are utilized. The body is located within the magnetic field at a temperature essentially $T_C$, the body being oriented in a substantially demagnetized orientation. If it is a flat body, as is body 10, its flat side is perpendicular to the direction of the magnetic field as seen in FIGS. 3 and 4. The body is rotated within the housing to a state of partial magnetization which causes an adiabatic temperature rise within the body from essentially $T_C$ to essentially $T_H$. As the rotation continues, heat transfers from the body to the first of the two-phase fluids during completion of rotation to a magnetized position. This creates an isothermal magnetization of the body and the flat plate body is now essentially parallel to the field as seen in FIGS. 1 and 2. The body is then partially rotated within the field towards a demagnetized orientation to cause a temperature decrease back down to essentially $T_C$. As the rotation is completed to a demagnetized orientation, heat is transferred to the other two-phase fluid. Heat transfers from the first and second two-phase fluids at appropriate times to an external heat sink and a heat source to accomplish refrigeration after or during the isothermal parts of the cycle.

In utilizing the invention to approximate an Ericsson cycle, again the ferromagnetic body is operated near its Curie temperature and is disposed within a magnetic field. It is rotated about an axis perpendicular to the field and an internal heat exchange fluid containing regenerator positioned over the body is slidable between a bottom position and a top position. The body is disposed within the field at a substantially demagnetized orientation at a temperature of essentially $T_H$. The body is rotated within the field to a substantially magnetized orientation while transferring heat through the internal fluid to a first external two-phase fluid or a first very large thermal mass. This results in isothermal magnetization of the body. The body is then cooled with the internal regenerator fluid, causing it to cool to a temperature of essentially $T_C$, the body still being in the substantailly magnetized orientation at this stage. The body is then rotated to a substantially demagnetized orientation while heat is transferred from the internal fluid to a second external two-phase fluid or second very large thermal mass, the temperature of the body remaining essentially at $T_C$.

In utilizing the invention to approximate a Stirling cycle, the ferromagnetic body is operated near its Curie temperature and is disposed within a magnetic field. The body is positioned within the field at a temperature essentially $T_H$ such that the demagnetizing factor is between zero and unity, the body being partially magnetized. The body is rotated to a state of higher magnetization such that the demagnetizing factor is about zero. During this rotation heat is transferred to a two-phase fluid such that the temperature remains constant at $T_H$. The body is next rotated to a state of partial demagnetization while an internal regenerator fluid cools the body to a temperature $T_C$. As the rotations is completed, the demagnetizing factor approaches unity and heat is absorbed by the body from a second two-phase fluid with the temperature remaining constant at $T_C$. A partial rotation while the regenerator fluid heats the body back to $T_H$ completes the cycle. The external two-phase fluids circulate to either absorb heat from an external load at $T_C$ or reject heat to an external sink at $T_H$. The cycle contains two isomagnetization stages and two isothermal stages. Because the magnetization increases as the temperature decreases, the field in the material must be changed by partial rotation to maintain a constant magnetization during the regeneration steps of the cycle.

The foregoing description of the preferred embodiment of the invention have been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of refrigeration approximating a Brayton cycle utilizing near its Curie temperature, a ferromagnetic body which is geometrically structured to undergo magnetization and demagnetization in accordance with its orientation in a magnetic field, said body being rotatable about an axis substantially perpendicular to the field between substantially magnetized and substantially demagnetized positions, and an internal heat exchange fluid containing regenerator slidably positioned about the body along the axis between a bottom position and a top position and thermally communicating with two external heat exchange transfer fluids, the method comprising the steps of:
   (a) positioning the regenerator and body in a substantially demagnetized orientation within the field at a temperature essentially $T_H$, the body being oriented so that its demagnetizing factor due to its geometric structure is near unity, the regenerator being in its bottom position;
   (b) rotating the body within the regenerator to a substantially magnetized position, thereby magnetizing the body and increasing its temperature from essentially $T_H$ to essentially $T_H + \Delta T_H$;
   (c) moving the generator from its bottom position to its top position, thereby warming the internal heat exchange fluid therein and cooling the still magnetized body to a temperature of essentially $T_C$;
   (d) again rotating the body within the regenerator to a substantially demagnetized position to adiabatically demagnetize the body from its temperature of essentially $T_C$ to a temperature of essentially $T_C - \Delta T_C$;
   (e) moving the regenerator to its bottom position to cool the internal heat exchange fluid therein and warm the body to essentially $T_H$; and
   (f) transferring heat from the internal heat exchange fluid appropriately during the cycle to two external heat exchange transfer fluids to accomplish refrigeration.

2. A method of refrigeration approximating a Carnot cycle utilizing near its Curie temperature a ferromagnetic body which is geometrically structured to undergo magnetization and demagnetization in accordance with its orientation in a magnetic field, said body being rotatable about an axis substantially perpendicular to the field between substantially magnetized and substantially demagnetized positions, and an internal two-phase heat exchange fluid containing housing disposed over the body, said housing thermally communicating with first and second external two-phase fluids, the method comprising the steps of:
   (a) locating the housing enclosed body within the field at a temperature essentially $T_C$ with the body oriented in a substantially demagnetized orientation;
   (b) rotating the body to a state of partail magnetization, thereby causing an adiabatic temperature rise within the body from essentially $T_C$ to essentially $T_H$;
   (c) continuing the rotation of the body while transferring heat from the body to the first of the two-phase fluids during the completion of the rotation to a magnetized orientation, thereby creating an isothermal magnetization of the body;
   (d) partially rotating the body within the field towards a demagnetized orientation thereby causing a temperature decrease back to essentially $T_C$, completing rotation of the body to a demagnetized orientation during which heat is transferred to the second two-phase fluid; and
   (e) transferring heat from the first and second two-phase fluids at appropriate times to external heat sink and source to accomplish refrigeration.

3. The method of claim 2 wherein the first and second two-phase fluids have very large heat capacities.

4. A method of refrigeration approximating an Ericsson cycle utilizing, near its Curie temperature, a ferromagnetic body disposed in a magnetic field, the body being geometrically structured to undergo magnetization and demagnetization in accordance with its orientation in a magnetic field, the body being rotatable about an axis perpendicular to the field, an internal heat exchange fluid containing regenerator slidably positionable over the body, along the axis between a bottom position and a top position, the method comprising the steps of:
   (a) positioning the body within the field at a temperature of essentially $T_H$ with the body disposed in a substantially magnetized orientation;
   (b) rotating the body within the field to a substantially demagnetized orientation while transferring heat to a first external two-phase fluid or a first very large thermal mass, resultring in isothermal demagnetization of the body;
   (c) cooling the body with the internal regenerator fluid, thereby causing it to reach a temperature of essentially $T_C$ with the body still in the substantially demagnetized orientation;
   (d) rotating the body to a substantially magnetized orientation while transferring heat to a second external two-phase fluid or second very large thermal mass so that the body remains essentially at temperature $T_C$;
   (e) increasing the temperature of the body from essentially $T_C$ to essentially $T_H$ by moving the regenerator from its bottom position to its top position.

5. The method of claim 4 wherein the internal regenerator fluid has a very large heat capacity.

6. A method of refrigeration approximately a Stirling cycle utilizing, near its Curie temperature, a ferromagnetic body which is geometrically structured to undergo magnetization and demagnetization in accordance with its orientation in a magnetic field, the body being rotatable about an axis perpendicular to the field, an internal heat exchange fluid containing regenerator slidable disposed about the body, the regenerator being slidable over the body along the axis between a bottom position and a top position, the method comprising the steps of:
   (a) positioning the body at a first temperature of essentaiily $T_H$ at an orientation partially rotated from a substantially demagnetized orientation so that it is partially magnetized;
   (b) rotating the body to a substantially magnetized orientation and transferring heat from the body to a first external two-phase fluid or first very large thermal mass;
   (c) cooling the body with the internal regenerator fluid to a temperature of essentially $T_C$ as it is rotated to maintain constant magnetization;
   (d) utilizing a second external two-phase fluid or second very large thermal mass to cause an isothermal substantially complete demagnetization of the body as it is rotated to an orientation of complete demagnetization;

(e) utilizing the regenerator fluid to warm the body to a temperature of essentially $T_H$; and (f) partially rotating the body to maintain constant magnetization, thereby bringing the body to essentially temperature $T_H$.

7. A refrigeration apparatus comprising:

a regenerator having a top and a bottom rotatable about an axis slidable therealong from a top position to a bottom position, said regenerator having fluid passing conduits at top and bottom;

ferromagnetic body means geometrically structured to undergo magnetization and demagnetization in accordance with its orientation in a magnetic hold, said body means being slidably disposed within said regenerator, said body means being structured to effectively transfer heat to and from fluid passing thereby;

means for producing a magnetic field substantially perpendicular to said regenerator and said body therein;

means for rotating said body and said regenerator about said axis within and substantially perpendicular to said magnetic field;

means for sliding said regenerator along its axis between said top position and bottom position; and means for passing heat exchange fluid past said body within said regenerator.

8. The invention of claim 7 wherein said body comprises a plurality of closely spaced flat plates of ferromagnetic material.

9. The invention of claim 8 wherein said magnetic field producing means comprises a pair of permanent magnets spaced opposite one another.

10. Refrigeration apparatus comprising:

means for producing a magnetic field;

a ferromagnetic body disposed in a magnetic field produced by said magnetic field producing means, said body being geometrically structured to undergo magnetization and demagnetization in accordance with its orientation within a magnetic field;

means for rotating said body about an axis essentially perpendicular to said field between a substantially magnetized orientation and a substantially demagnetized orientation;

means for exchanging heat with said body at selected times to accomplish refrigeration.

11. the invention of claim 10 wherein said heat exchanging means comprises fluid.

12. The invention of claim 11 wherein said body comprises a plurality of substantially flat essentially parallel masses having large, spaced, adjacent surface areas.

13. The invention of claim 11 wherein said body comprises porous ferromagnetic material.

14. The invention of claim 11 wherein said body comprises a plurality of parallel plates between which said fluid can pass.

15. The invention of claim 11 wherein said body comprises a plurality of parallel corrugated plates.

16. The invention of claim 11 wherein said body comprises a plurality of ribbed plates.

17. The invention of claim 11 wherein said body contains fluid passing apertures.

18. The invention of claim 11 wherein said body comprises ferromagnetic material having substantial surface area capable of heat transfer to fluid contacting said body.

19. The invention of claim 12 wherein said body comprises a plurality of discrete masses of ferromagnetic material.

20. A refrigeration apparatus comprising:

means for producing a magnetic field;

a ferromagnetic body disposed within said magnetic field, said body being of a configuration to be magnetized and demagnetized in accordance with its orientation in said field;

means for rotating said body about an axis essentially perpendicular to said field from a position of substantial magnetization to a position of substantial demagnetization;

a housing means disposed about said body; and fluid means communicating with said housing means for exchanging heat with said body at selected intervals to accomplish refrigeration.

* * * * *